United States Patent
Jayadeva et al.

(10) Patent No.: US 8,271,281 B2
(45) Date of Patent: Sep. 18, 2012

(54) METHOD FOR ASSESSING PRONUNCIATION ABILITIES

(75) Inventors: Jayadeva, New Delhi (IN); Sachindra Joshi, New Delhi (IN); Himanshu Pant, Uttaranchal (IN); Ashish Verma, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 1009 days.

(21) Appl. No.: 12/147,898

(22) Filed: Jun. 27, 2008

(65) Prior Publication Data

US 2009/0171661 A1 Jul. 2, 2009

Related U.S. Application Data

(60) Provisional application No. 61/017,279, filed on Dec. 28, 2007.

(51) Int. Cl.
*G10L 17/00* (2006.01)
*G09B 19/04* (2006.01)

(52) U.S. Cl. ............ 704/250; 434/185; 704/270

(58) Field of Classification Search .............. None
See application file for complete search history.

(56) References Cited

U.S. PATENT DOCUMENTS

| | | | |
|---|---|---|---|
| 5,870,709 A | 2/1999 | Bernstein | |
| 6,157,913 A | 12/2000 | Bernstein | |
| 6,953,343 B2 | 10/2005 | Townshend | |
| 7,302,389 B2* | 11/2007 | Gupta et al. | 704/235 |
| 7,624,013 B2* | 11/2009 | Barker | 704/251 |
| 7,873,522 B2* | 1/2011 | Du et al. | 704/275 |
| 7,962,327 B2* | 6/2011 | Kuo et al. | 704/9 |
| 2002/0133340 A1* | 9/2002 | Basson et al. | 704/235 |
| 2002/0156632 A1* | 10/2002 | Haynes et al. | 704/270 |
| 2002/0160341 A1* | 10/2002 | Yamada et al. | 434/157 |
| 2003/0225580 A1* | 12/2003 | Lin | 704/254 |
| 2004/0215445 A1 | 10/2004 | Kojima | |
| 2004/0230430 A1* | 11/2004 | Gupta et al. | 704/235 |
| 2005/0273017 A1* | 12/2005 | Gordon | 600/544 |
| 2005/0277103 A1 | 12/2005 | Townshend et al. | |
| 2006/0008781 A1 | 1/2006 | Townshend et al. | |
| 2007/0033017 A1 | 2/2007 | Nair et al. | |
| 2007/0055514 A1* | 3/2007 | Beattie et al. | 704/235 |
| 2007/0055523 A1* | 3/2007 | Yang | 704/257 |
| 2009/0070112 A1* | 3/2009 | Li et al. | 704/257 |
| 2009/0119109 A1* | 5/2009 | Willmann et al. | 704/271 |
| 2009/0239201 A1* | 9/2009 | Moe | 434/157 |
| 2009/0305203 A1* | 12/2009 | Okumura et al. | 434/185 |

OTHER PUBLICATIONS

Bernstein et al., Automatic Evaluation and Training in English Pronunciations, ICSLP, Kobe, Japan (1990).
Carnegie Speech, http://www.carnegiespeech.com/.
Franco et al., SRI International, Automatic Scoring for Language Instruction, ICASSP 97.
Ordinate, http://www.ordinate.com/.

* cited by examiner

*Primary Examiner* — Talivaldis Ivars Smits
(74) *Attorney, Agent, or Firm* — Wolf, Greenfield & Sacks, P.C.

(57) ABSTRACT

Techniques for assessing pronunciation abilities of a user are provided. The techniques include recording a sentence spoken by a user, performing a classification of the spoken sentence, wherein the classification is performed with respect to at least one N-ordered class, and wherein the spoken sentence is represented by a set of at least one acoustic feature extracted from the spoken sentence, and determining a score based on the classification, wherein the score is used to determine an optimal set of at least one question to assess pronunciation ability of the user without human intervention.

15 Claims, 2 Drawing Sheets

METHOD FOR ASSESSING PRONUNCIATION ABILITIES

CROSS REFERENCE TO RELATED APPLICATIONS

This application claims the benefit of U.S. Provisional Application Ser. No. 61/017,279, filed on Dec. 28, 2007, the disclosure of which is incorporated by reference herein.

FIELD OF THE INVENTION

The present invention generally relates to information technology, and, more particularly, to speech recognition.

BACKGROUND OF THE INVENTION

Existing speech recognition approaches include interactive language proficiency testing systems using speech recognition. For example, an existing approach to automatic pronunciation evaluation is discussed in Bernstein et al., "Automatic Evaluation and Training in English Pronunciation," ICSLP, Kobe, Japan (1990), the contents of which are incorporated herein by reference. Such an approach includes evaluating each utterance from subjects who are reading a pre-selected set of scripts for which training data has been collected from native speakers. In this system, a pronunciation grade may be assigned to a subject performance by comparing the subject's responses to a model of the responses from the native speakers.

Existing approaches also include, for example, using a hidden Markov model (HMM) based phone log posterior probability for scoring. A set of context independent models can be used along with HMM based phone alignments to compute an average posterior probability for each phone. The time alignment can be generated by viterbi, and the database can include 100 native speakers. Also, in such an approach, the log posterior probability of each frame can be discovered, summed up for all the frames aligned, and then time normalized by the duration. To generate a sentence score, the score for each phone is averaged over all the sentences.

Other existing approaches can also include, for example, a manually designed flow of questions (for example, an increasing difficulty level), a question selected to cover a wide variety (various sounds captured), assessment tools, and questions selected based on a static manner based on their discriminating power (for example, sensei grammar evaluation).

SUMMARY OF THE INVENTION

Principles of the present invention provide techniques for assessing pronunciation abilities.

An exemplary method (which may be computer-implemented) for assessing pronunciation abilities of a user, according to one aspect of the invention, can include steps of recording a sentence spoken by a user, performing a classification of the spoken sentence, wherein the classification is performed with respect to at least one N-ordered class, and wherein the spoken sentence is represented by a set of at least one acoustic feature extracted from the spoken sentence, and determining a score based on the classification, wherein the score is used to determine an optimal set of at least one question to assess pronunciation ability of the user without human intervention.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
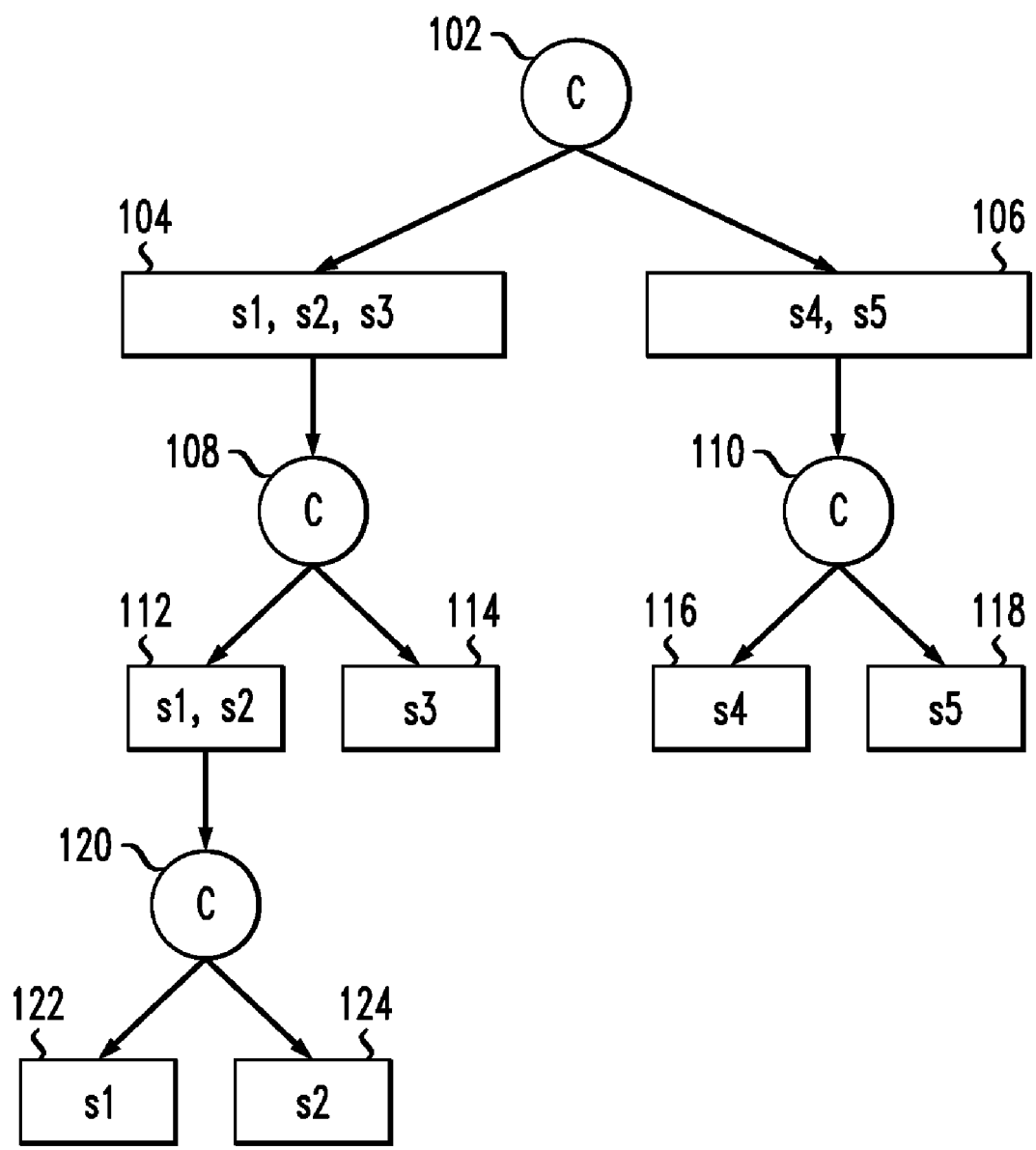
FIG. 1 is a diagram illustrating a binary search tree, according to an embodiment of the present invention.

Principles of the present invention include techniques for automated assessment of the pronunciation abilities of users (for example, human beings). For example, techniques are provided for automated pronunciation ability assessment using speech recognition with a call center agent in mind, leading to a classification between a good and a bad speaker, which is in sync with the human judgment of one of the N ordered classes. Also, one or more embodiments of the invention include using the discriminating power and quality of a data subset (in terms of questions) to compute an optimal subset for assessment of the candidate.

As an example, assume that a candidate is given a set of 20 randomly selected sentences to speak. For each spoken sentence, a feature vector is generated and assessed on an integral scale of 1 to K by human assessor(s). Subsequent objectives can include, for example, obtaining a score for each candidate based on the spoken 20 sentences which matches the human score, determining which set of sentences is most discriminating for each of the K categories, and determining how to pick a minimal set of sentences for a new candidate.

One or more embodiments of the present invention determine the pronunciation classifiability of a sentence when spoken by a user with respect to N ordered classes, where the spoken sentence is represented by a set of acoustic features extracted from the sentence recording. Classifiability scores can be used, for example, to determine the best sequence of questions and the best set of questions to be given to a candidate in order to evaluate him accurately and efficiently.

Also, the techniques described herein include finding out the pronunciation ability of a candidate, and finding out a basis to choose sentences in such a way which can lead to the most accurate and efficient assessment of the candidate in sync with the human judgment of N classes.

One or more embodiments of the invention include a feature representation of spoken sentences. As described herein, one or more embodiments of the invention focus on the speaking styles of a user while giving the test, which give an indication about how good or bad the speaker is. Such an approach can be, for example, generalized to assess people of different domain, and for different languages, etc.

A front end system for interacting with the candidate interacts with a database. A candidate, after logging into the system, can be taken to the instruction set of the test. The candidate can be shown a page which has text prompts to be spoken by him or her. The prompts can be variable in number. Each prompt can have a record button and a stop button, and there can be a time-out associated with each prompt. When the candidate clicks the record button, his speech is captured and stored in the database. Additionally, there can be a time-out for the whole test as well.

One or more embodiments of the present invention include a speech recognition system which, given a speech utterance and the corresponding text, does a forced viterbi decoding using a speech recognition model which was trained on, for example, about 100 expert speakers on the same training script that the candidate is given to read out. Such a model can be used to align the text in terms of the phoneme and their time stamps. The model can also decode the disfluencies present, if any. Along with the phoneme details and their time alignment, a model can give the confidence of each phoneme as well as each word. This confidence score is calculated as per the following equation.

$$ALLR = \frac{\sum_{t=1}^{T} \log P(s_{i^*} \mid o_t)}{\sum_{t=1}^{T} \max_{1 \le j \le s} \log P(s_j \mid o_t)},$$

where ALLR is• the confidence of the decoded output for an utterance including T acoustic observation vectors corresponding to T speech frames, S is the set of output states of the HMM, $o_t$ is the t-th acoustic observation vector, $s_i$• is the sequence of states (indexed by i•) produced by the Viterbi alignment of the utterance, and $s_j$ is the most likely state for the frame t without any constraints, meaning without being constrained by the model w of the word.

The ALLR can be normalized by the time duration of the phone and word to get the phone and word confidence score, respectively. As such, for the decoded text, confidence score for each word and/or phone, time duration for each word and/or phone, and disfluencies present, if any, are obtained.

In one or more embodiments of the invention, the following steps may be performed to obtain a set of derived features that can be used for various tasks such as, for example, representing a sentence, determining the discriminating power of a sentence, performing a classification experiment, etc. All phone confidence scores can be summed. All time durations for phones can be summed. A total phone confidence score can be normalized by the total time duration. Also, a total phone confidence score can be normalized by the total number of phones. All word confidence scores can be summed. All time durations for words can be summed. A total word confidence score can be normalized by the total time duration. A total word confidence score can be normalized by the total number of phones. Additionally, the number of disfluencies can be counted. One or more steps can be performed for specific phones called focus sounds, which are more discriminatory in nature. Also, one or more steps can be performed for specific words, which are more discriminatory in nature.

Apart from the features mentioned above, one can discover additional features by performing a free decoding, in which there is no constraint of grammar and any word or phone can occur anywhere. One or more embodiments of the invention can also discover, for example, substitution errors, insertion errors, and/or deletion errors.

This can be explained through an example, as illustrated below. Suppose that a candidate was supposed to say the word "Student." This word broken down into phonetics is spelt as below:

S T UW D EH NT

Suppose that three candidates spoke it in the following way:

S T UW D EY N T, Substitution error, EH substituted by EY.

S T Y UW D EH N T, Insertion error, Y inserted between T and UW.

S T UW D EH N, Deletion of the last phone T.

As a result, these different errors are also features for the classifier.

One or more embodiments of the invention include determining classifiability of a sentence and designing a test to assess the candidate using this information. Spoken language is more difficult to assess than text because the candidate population has many different ways of speaking the same input text, incorporating their mother tongue influence and different styles and personality type. Moreover, the features from a speech decoding engine (as described above) which can be used to decode the candidate speech to be analyzed tend to be noisy and their relevance not easily understandable. Also, it is difficult to categorize sentences based on similarity or difference from the viewpoint of quality assessment.

Principles of the present invention include, for example, the basic premise that a human assessor evaluates the pronunciation abilities of a subject from a sample set of sentences, and that the assessment made by using a set of sentences is more robust than that made by using a single sentence. This assumption that a set of sentences leads to more robust classification can also be made for any classifier constructed using machine learning or other approaches. This assumption has been validated through various experiments, as the correlation of human assessment on a sentence level is much less than on a candidate level. As such, if only one sentence is given to assess a candidate, one is less likely to be correlated to the human judgment as compared to a set of sentences. Also, as described herein, some sentences are better for some candidates belonging to one of the N classes.

In such a setting, there can be a lot of data of candidates which has been assessed by human experts. The data can be divided into two sets, a training set and a test set. In a modification of this setting, one may have other sets such as, for example, a validation set, to assist in the generation of the classifier.

One or more embodiments of the invention include a training set, which is a group of candidates assessed on a set of sentences wherein each sentence has been given a rating of 1 to N by the human experts. For the sake of convenience, let us denote the decision boundary constructed by using the training data as, for example, $D_{train}$. This boundary can be constructed, for example, by using data corresponding to a set of subjects who have spoken a set of sentences (usually of a fixed size).

Suppose, for example, that additional classifiers are built from this training data, but where the training data has been restricted to only a particular sentence that has been spoken by a number of subjects. Let the sentence index be denoted by i, and the decision boundary of the classifier so built as $D_{train,i}$. Also, the similarity between $D_{train}$ and $D_{train,i}$ can be taken as a measure of how effective sentence i is in discriminating the quality of a subject. That is, sentences with high similarity are more effective than those with a low similarity.

The similarity may be judged in a number of ways. By way of example and not limitation, consider the case where the classifier is a support vector machine (SVM) built by using a linear kernel. Also, assume that a binary search tree is being used as a preferred embodiment of the invention. The diagram of such an embodiment is depicted in FIG. 1. FIG. 1 is a diagram illustrating a binary search tree, according to an embodiment of the present invention. By way of illustration, FIG. 1 depicts the elements of C 102, "s1, s2, s3" 104, "s4, s5" 106, C 108, C 110, "s1,s2" 112, "s3" 114, "s4" 116, "s5" 118, C 120, "s1" 122 and "s2" 124. As illustrated in FIG. 1, the circles, labeled as "C," are classifiers and blocks, labeled as "S," are the class(es). In FIG. 1, the classifier labeled as 102 classifies between the class groups {s1, s2, s2} and {s4, s5}. Similarly, the classifier labeled as 108 classifies the data between class groups {s1, s2} and class s3, etc.

As such, there are a set of questions to be asked at each level to classify the candidate into one of the two groups of classes, or one of the two classes. As depicted in FIG. 1, one can start with a classification between class {1,2,3} in one group and class {4,5} in the other group. In order to do this, one gives the candidate those questions which are best discriminatory for this classification. As such, one can successfully continue doing this until a leaf node is reached, and that is the category to which the candidate will be assigned.

Additionally, one or more embodiments of the present invention generate (K−1) classifiers corresponding to the binary search tree for the K classes using the training data available where the $i^{th}$ classifier would classify between class I and classes $\{i+1, i+2, \ldots, K\}$. This can be done because the classes are ordinal. For the $(i-1^{th})$ classifier (for example, SVM), one can let $w_i$ denote the parameter vector. Note that $w_i$ depends on the entire sample set. Also, the $(i-1^{th})$ classifier can be determined by using only a subset $S_g$ of sentences resulting in a parameter vector of $w_i^g$. This group can be, for example, speech training data and the human labels from different candidates corresponding to a single sentence, or any other subset of samples grouped by any other criterion.

The inner product $<w, w_i^g>$ indicates the alignment of the two classifiers and the measure of similarity of the two classifiers. Note that one could also use kernel alignment to determine the same. For each of the (K−1) classifiers, one can determine which sentence is the most discriminative. In a more general setting, one can determine which subgroup of sentences is the most discriminative. Discrimination can be based, for example, on the error rate, or better, the alignment of the classifier using a specific sentence (or a subset of sentences), with the classifier built using all of the data (or sentences). Given a candidate, at most $\log_2(K)$ sentences are to be used to determine which category he or she falls in. For determining the decision at each level of the tree, the appropriate sentence(s) are to be provided. Depending on the confidence level required, sentences that are best aligned to the optimal choice can be additionally used at each level of the search tree.

Alignment can also be computed by using classifiers determined across data from different assessors. This analysis can be useful, for example, to determine how different assessors are aligned to each other. This will help indicate assessors who are "deviants." Also, such an analysis can be useful to determine which sentences a specific assessor is more likely to deviate from the general norm. Consider a training scenario in which M training exemplars are used to build a classifier and/or regressor. For simplicity, consider a binary classification scenario. The exemplars can belong to K sub-groups. The finally built classifier can be tested against a training set, possibly unknown at the time of training. Also, one or more embodiments of the invention include determining the discriminating ability and consistency of a subset of samples, or a sub-group including a specific type of sample (for example, a category of samples). The techniques described herein allow one to select a minimal set of sub-groups for evaluating the quality of a data set.

In an illustrative embodiment of the invention, a classifier can be built using the entire available data. One can assume, for example, that the classifier is parameterized by n parameters, and that the parameter vector is given by w. For instance, w can be the weight vector of a SVM classifier. Also, a classifier can be built using a sub-group. One can let the parameter vector of this sub-group by $w^g$. The inner product between w and $w^g$, (that is, $<w, w^g>$) indicates how well classification using the sub-group alone is aligned with the overall classifier.

As described herein, one or more embodiments of the present invention include the selection of a question set for evaluation that can be based on speech training data and human labels, as well as include techniques to minimize the amount of speech data required for evaluation of a candidate. Because human decisions are subjective, using the human labels at a sentence level is not advantageous (for example, they can give the same labels for all the sentences for a candidate). Instead, one or more embodiments of the invention take the label for the candidate as a whole and investigate which sentences are more discriminative.

Additionally, one or more embodiments of the present invention include assessing the discriminative power of a given sentence with respect to a given class pair(s), as well as determining a set of sentences that is most discriminative for a given class pair. Further, the techniques described herein include determining the best (optimal or minimum) sequence of sentences in real-time given to a candidate as the test proceeds, and obtaining an aggregated speech feature vector for a candidate based on his N recorded utterances and then use that for evaluation.

Figure 2:
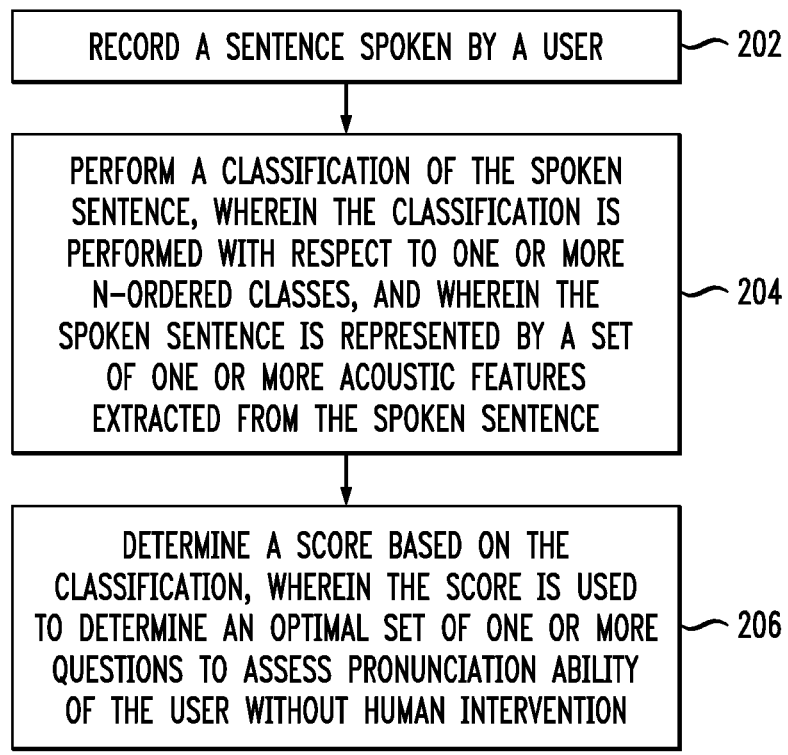
FIG. 2 is a flow diagram illustrating techniques for assessing pronunciation abilities of a user, according to an embodiment of the present invention.

FIG. 2 is a flow diagram illustrating techniques for assessing pronunciation abilities of a user, according to an embodiment of the present invention. Step 202 includes recording a sentence spoken by a user. For each spoken sentence, a feature vector can be generated and assessed on an integral scale of 1 to K by human assessors.

Step 204 includes performing a classification of the spoken sentence, wherein the classification is performed with respect to one or more N-ordered classes, and wherein the spoken sentence is represented by a set of re acoustic features extracted from the spoken sentence. The one or more N-ordered classes can include, for example, a plurality of different classes.

Step 206 includes determining a score based on the classification, wherein the score is used to determine an optimal set of questions (for example, the set of next questions) to assess pronunciation ability of the user without human intervention. The score can be used to determine a set of sentences that are most discriminating for a given class pair when spoken by a user. Also, the score can be used to determine a minimal sequence of sentences to be spoken by a user to classify the user in one of the given N-ordered classes in such a way that it matches the class assigned by a human expert.

The techniques depicted in FIG. 2 can also include, for example, performing a forced viterbi decoding using a speech recognition model, wherein the model is trained on at least one expert speaker using a training text that a candidate will be given to read. The model can be used for, by way of example, aligning text in terms of phoneme and/or time stamp, decoding disfluencies, and/or giving the confidence of each phoneme and each word.

One or more embodiments of the present invention also include discovering a substitution error, an insertion error and/or a deletion error. Also, training data can be used, wherein the training data includes a group of candidates assessed on a set of sentences, and wherein each sentence is given a rating of 1 to N by human experts. The training data can be used, for example, to generate K−1 classifiers corresponding to a binary search tree for K classes. Additionally, for each of the K−1 classifiers, one can determine which sentence is most discriminative.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 3:
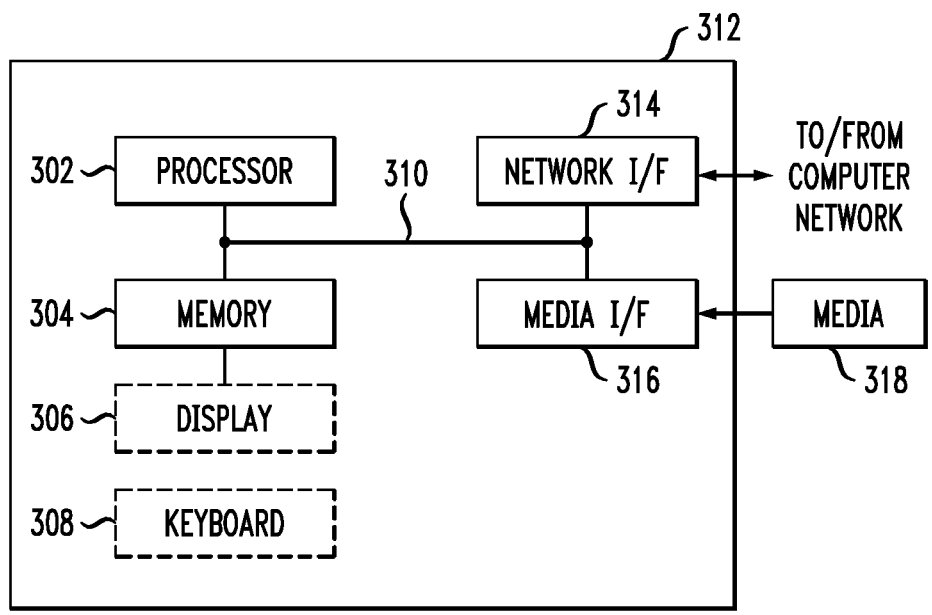
FIG. 3 is a system diagram of an exemplary computer system on which at least one embodiment of the present invention can be implemented.

At present, it is believed that the preferred implementation will make substantial use of software running on a general-purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 304), magnetic tape, a removable computer diskette (for example, media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using the discriminating power and quality of a data subset to compute an optimal subset of training samples.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for assessing pronunciation abilities of a user, the method comprising:
   presenting at least one text prompt to the user;
   recording at least one spoken input spoken by the user in a language in response to the at least one text prompt; and
   automatically assigning, by using at least one processor and at least one classifier, the user to one of a plurality of classes based on one or more features obtained from the at least one recorded spoken input, wherein each of the plurality of classes corresponds to a pronunciation ability in the language,
   wherein the at least one classifier comprises a first classifier, wherein the plurality of classes comprises a first subset of classes comprising at least one class and a second subset of classes comprising at least one class, wherein the first subset of classes is disjoint from the second subset of classes, wherein:

presenting the at least one text prompt comprises presenting a first text prompt to the user, recording the at least one spoken input comprises recording a first spoken input spoken by the user in response to the first text prompt, assigning the user to one of the plurality of classes comprises determining whether the user belongs to any class in the first subset of classes or to any class in the second subset of classes by applying the first classifier to one or more features obtained from the first spoken input, and wherein the method further comprises:

presenting a second text prompt to the user if it is determined that the user belongs to any class in the first subset of classes; and presenting a third prompt to the user if it is determined that the user belongs to any class in the second subset of classes, wherein the second prompt is different from the third prompt.

2. The method of claim 1, wherein the at least one classifier further comprises a second classifier different from the first classifier, the first subset of classes comprises a third subset of classes comprising at least one class and a fourth subset of classes comprising at least one class, wherein the third subset of classes is disjoint from the fourth subset, and wherein:

recording the at least one spoken input further comprises recording a second spoken input spoken by the user in response to the second text prompt; and assigning the user to one of the plurality of classes further comprises determining whether the user belongs to any class in the third subset of classes or to any subset in the fourth subset of classes by applying the second classifier to the one or more features obtained from the first spoken input and/or one or more features obtained from the second spoken input.

3. The method of claim 1, wherein using the at the least one classifier comprises using at least one classifier trained by using recordings of spoken input spoken by a plurality of speakers in response to being presented with the at least one text prompt.

4. The method of claim 1, wherein the one or more features comprise at least one feature selected from the group consisting of presence of one or more substitution errors, presence of one or more insertion errors, and presence of one or more deletion errors.

5. A method for assessing pronunciation abilities of a user, the method comprising:

presenting at least one text prompt to the user;

recording at least one spoken input spoken by the user in a language in response to the at least one text prompt; and automatically assigning, by using at least one processor and at least one classifier, the user to one of a plurality of classes based on one or more features obtained from the at least one recorded spoken input, wherein each of the plurality of classes corresponds to a pronunciation ability in the language, wherein the at least one classifier comprises a first classifier, wherein the plurality of classes comprises a first subset of classes comprising at least one class and a second subset of classes comprising at least one class, wherein the first subset of classes is disjoint from the second subset of classes, and wherein:

presenting the at least one text prompt comprises presenting a first text prompt to the user, recording the at least one spoken input comprises recording a first spoken input spoken by the user in response to the first text prompt, assigning the user to one of the plurality of classes comprises determining whether the user belongs to any class in the first subset of classes or to any class in the second subset of classes by applying the first classifier to one or more features obtained from the first spoken input, wherein the at least one classifier further comprises a second classifier different from the first classifier, the first subset of classes comprises a third subset of classes comprising at least one class and a fourth subset of classes comprising at least one class, wherein the third subset of classes is disjoint from the fourth subset, and wherein assigning the user to one of the plurality of classes further comprises:

determining whether the user belongs to any class in the third subset of classes or to any subset in the fourth subset of classes by applying the second classifier to one or more features obtained from the first spoken input.

6. A method comprising:

presenting at least one text prompt to the user;

recording at least one spoken input spoken by the user in a language in response to the at least one text prompt; and automatically assigning, by using at least one processor and at least one classifier, the user to one of a plurality of classes based on one or more features obtained from the at least one recorded spoken input, wherein each of the plurality of classes corresponds to a pronunciation ability in the language, wherein the at least one classifier comprises a plurality of binary classifiers hierarchically organized according to a hierarchy, and wherein using the at least one classifier comprises:

applying one or more classifiers in the plurality of binary classifiers, in accordance with the hierarchy, to the one or more features extracted from the at least one recorded spoken input.

7. A system for assessing pronunciation abilities of a user, the system comprising:

at least one processor programmed to:

present at least one text prompt to the user;

record at least one spoken input spoken by the user in a language in response to the at least one text prompt; and automatically assign, by using at least one classifier, the user to one of a plurality of classes based on one or more features obtained from the at least one recorded spoken input, wherein each of the plurality of classes corresponds to a pronunciation ability in the language, wherein the at least one classifier comprises a first classifier, wherein the plurality of classes comprises a first subset of classes comprising at least one class and a second subset of classes comprising at least one class, wherein the first subset of classes is disjoint from the second subset of classes, wherein the at least one processor is programmed to:

present the at least one text prompt at least by presenting a first text prompt to the user;

record the at least one spoken input at least by recording a first spoken input spoken by the user in response to the first text prompt; and assign the user to one of the plurality of classes at least by determining whether the user belongs to any class in the first subset of classes or to any class in the second subset of classes by applying the first classifier to one or more features obtained from the first spoken input, and wherein the at least one processor is further programmed to:

present a second text prompt to the user if it is determined that the user belongs to any class in the first subset of classes; and present a third prompt to the user if it is determined that the user belongs to any class in the second subset of classes, wherein the second prompt is different from the third prompt.

8. The system of claim 7, wherein the at least one classifier further comprises a second classifier different from the first classifier, the first subset of classes comprises a third subset of classes comprising at least one class and a fourth subset of classes comprising at least one class, wherein the third subset of classes is disjoint from the fourth subset, and wherein the at least one processor is further programmed to:

record the at least one spoken input at least by recording a second spoken input spoken by the user in response to the second text prompt; and assign the user to one of the plurality of classes at least by determining whether the user belongs to any class in the third subset of classes or to any subset in the fourth subset of classes by applying the second classifier to the one or more features obtained from the first spoken input and/or one or more features obtained from the second spoken input.

9. The system of claim 7, wherein the user is a call center agent.

10. A system for assessing pronunciation abilities of a user, the system comprising:

at least one processor programmed to:

present at least one text prompt to the user;

record at least one spoken input spoken by the user in a language in response to the at least one text prompt; and automatically assign, by using at least one classifier, the user to one of a plurality of classes based on one or more features obtained from the at least one recorded spoken input, wherein each of the plurality of classes corresponds to a pronunciation ability in the language, wherein the at least one classifier comprises a plurality of binary classifiers hierarchically organized according to a hierarchy, and wherein the at least one processor is programmed to use the at least one classifier by applying one or more classifiers in the plurality of binary classifiers, in accordance with the hierarchy, to the one or more features extracted from the at least one recorded spoken input.

11. At least one computer-readable storage medium storing instructions that, when executed by at least one processor, cause the at least one processor to perform a method for assessing pronunciation abilities of a user, the method comprising:

presenting at least one text prompt to the user;

recording at least one spoken input spoken by the user in a language in response to the at least one text prompt; and automatically assigning, by using at least one processor and at least one classifier, the user to one of a plurality of classes based on one or more features obtained from the at least one recorded spoken input, wherein each of the plurality of classes corresponds to a pronunciation ability in the language, wherein the at least one classifier comprises a first classifier, wherein the plurality of classes comprises a first subset of classes comprising at least one class and a second subset of classes comprising at least one class, wherein the first subset of classes is disjoint from the second subset of classes, wherein:

presenting the at least one text prompt comprises presenting a first text prompt to the user, recording the at least one spoken input comprises recording a first spoken input spoken by the user in response to the first text prompt, assigning the user to one of the plurality of classes comprises determining whether the user belongs to any class in the first subset of classes or to any class in the second subset of classes by applying the first classifier to one or more features obtained from the first spoken input, and wherein the method further comprises:

presenting a second text prompt to the user if it is determined that the user belongs to any class in the first subset of classes; and presenting a third prompt to the user if it is determined that the user belongs to any class in the second subset of classes, wherein the second prompt is different from the third prompt.

12. The at least one computer-readable storage medium of claim 11, wherein the at least one classifier further comprises a second classifier different from the first classifier, the first subset of classes comprises a third subset of classes comprising at least one class and a fourth subset of classes comprising at least one class, wherein the third subset of classes is disjoint from the fourth subset, and wherein:

recording the at least one spoken input further comprises recording a second spoken input spoken by the user in response to the second text prompt; and assigning the user to one of the plurality of classes comprises determining whether the user belongs to any class in the third subset of classes or to any subset in the fourth subset of classes by applying the second classifier to the one or more features obtained from the first spoken input and/or one or more features obtained from the second spoken input.

13. The at least one computer-readable storage medium of claim 11, wherein using the at least one classifier comprises using at least one support vector machine classifier.

14. The at least one computer-readable storage medium of claim 11, wherein the user is a call center agent.

15. At least one computer-readable storage medium storing instructions that, when executed by at least one processor, cause the at least one processor to perform a method for assessing pronunciation abilities of a user, the method comprising:

presenting at least one text promt to the user;

recording at least one spoken input spoken by the user in a language in response to the at least one text prompt; and automatically assigning, by using at least one processor and at least one classifier, the user to one of a plurality of classes based on one or more features obtained from the at least one recorded spoken input, wherein each of the plurality of classes corresponds to a pronunciation ability in the language,
wherein the at least one classifier comprises a plurality of binary classifiers hierarchically organized according to a hierarchy, and wherein using the at least one classifier comprises:

applying one or more classifiers in the plurality of binary classifiers, in accordance with the hierarchy, to the one or more features extracted from the at least one recorded spoken input.

* * * * *